United States Patent

[11] 3,597,976

[72] Inventor Paul J. Fryar
 4359 Rutgers Ave., Long Beach, Calif. 90808
[21] Appl. No. 839,809
[22] Filed July 3, 1969
[45] Patented Aug. 10, 1971

[54] CLINICAL TEMPERATURE BANDAGE
 4 Claims, 9 Drawing Figs.
[52] U.S. Cl. ................................................. 73/358, 116/114.5
[51] Int. Cl. ............................................... G01k 11/08
[50] Field of Search ........................................ 73/356, 358; 116/114.5

[56] References Cited
UNITED STATES PATENTS
2,932,971 4/1960 Moore ........................... 73/358
3,175,401 3/1965 Geldmacher .................. 73/356
3,430,491 3/1969 Gignilliat ....................... 73/358
3,465,590 9/1969 Kluth ............................ 73/358

Primary Examiner—Louis R. Prince
Assistant Examiner—Denis E. Corr

ABSTRACT: A Clinical Temperature Bandage to be applied to the skin, usually under the arm, which has as an integral part thereof, a chemical holder containing, in separate small recesses, a plurality of chemicals having different melting points, each of which will become fluid at a different temperature thus making possible the estimation of body temperature. The plurality of chemicals used in this invention are essentially pure 2-ethoxy napthalene and mixtures of 2-ethoxy napthalene and lauric acid.

Patented Aug. 10, 1971
3,597,976
FIG-1
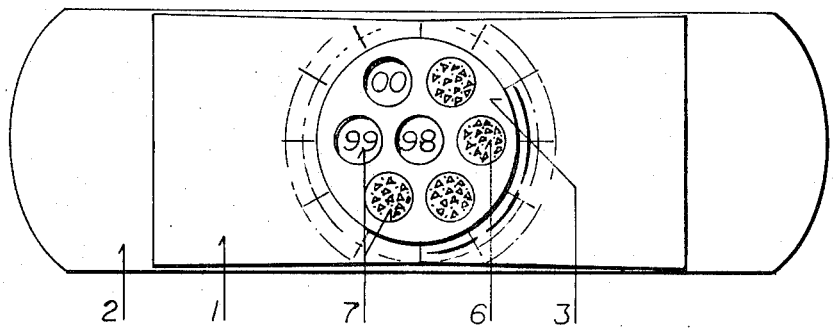
FIG-2
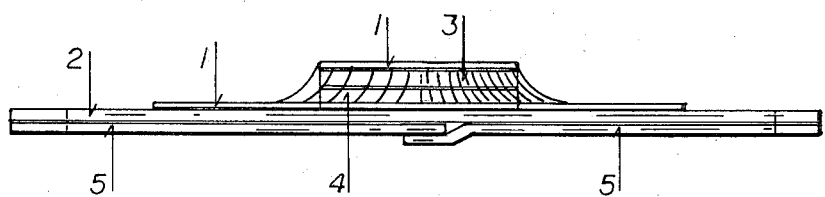
FIG-3  FIG-4  FIG-5  FIG-6
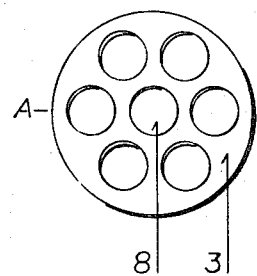 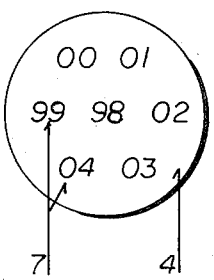 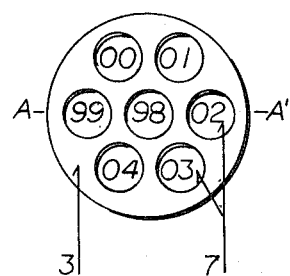 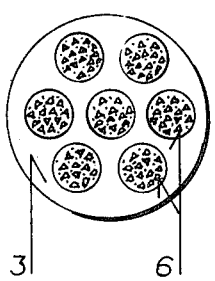
FIG-7  FIG-8
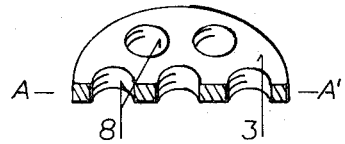 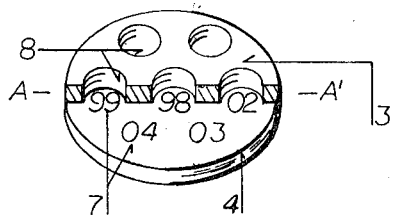
FIG-9
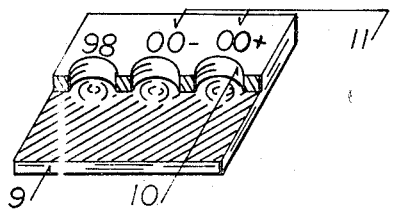
PAUL J FRYAR — INVENTOR
BY Paul J Fryar

CLINICAL TEMPERATURE BANDAGE

SUMMARY

The object of my invention is to provide a nonthermometric, simple, reasonably accurate, practical means for measuring body temperature. This is accomplished by exposing, to body heat, appropriate chemicals (materials), of known melting temperature, observing which chemicals melt and which do not, thus bracketing the body temperature between those of the highest melting material, that has become liquid, and the lowest melting of the materials that has remained solid.

To accomplish this objective a simple adhesive-bandage-type device was constructed. This Clinical Temperature Bandage included as an integral part of the unit several, separately stored chemicals, usually seven with appropriate melting temperatures approximately 1° F. apart, covering the range (but not limited to) from 98° F. to 104° F. See drawing, FIGS. 1 through 8.

This clinical Temperature Bandage, in use, was taped to the body, usually under the arm, where it was allowed to remain for approximately 5 minutes. The Clinical Temperature Bandage was observed one or more times during the test period. When no further change in the chemicals was observed the test was concluded. The temperature was recorded as equal to or higher than the highest melting temperature of any chemical that had become liquid, and lower than the lowest melting temperature of any solid that did not change phase. For example; if a chemical with a melting temperature 100° F. became liquid, and another chemical with a melting temperature of 101° F. remained solid, the temperature would be recorded as being between 100° F. and 101° F. This is well within the accuracy required to determine the need for special care or more thorough examination.

The appearance of the Clinical Temperature Bandage after test, per example above, would be essentially as shown in drawing FIG. 1. In this figure the chemicals have melted in three of the cylindrical recesses, thus disclosing the numbers, 98, 99, and 00. Numbers 01, 02, 03, and 04 are still hidden by the unmelted chemicals in these recesses. Numbers 00, 01, 02, 03, and 04 were used to represent temperatures 100° F. to 104° F. respectively, therefore 100 (00) being the highest number visible, the temperature measured is between 100° F. and 101° F.

Detailed Specification

To utilize the temperature-bracketing principle, described in the summary, the Clinical Temperature Bandage was so constructed that four specific objectives were accomplished:

1. Suitable chemicals (materials) or blends with satisfactory melting temperatures were found, by reference to published lists of chemicals or were developed by this inventor, to cover the temperature spread of 98° F. to 104° F.

2. A practical means was developed for containing, separately, satisfactorily and safely, the chemicals that were chosen for use in the Clinical Temperature Bandage.

3. A practical means was provided to identify the temperature at which each of the chemicals would liquefy, or change phase, and to accurately observe when such change had occurred.

4. A practical means was provided to obtain reasonable contact, or proximity, to the body (or item) whose temperature was to be estimated so that heat transfer, between the Clinical Temperature Bandage and the body, could be accomplished without appreciable outside temperature influence and within a practical period of time, usually 5 minutes or less.

In the Drawing:

FIG. 1 is a plan view of my Clinical Temperature Bandage.

FIG. 2 is a side elevation (profile) of the Clinical Temperature Bandage FIG. 1, the profile has been exaggerated in thickness for clarity of detail.

FIG. 3 is a plan view of the upper portion of the chemical holder, a thin disc containing holes (recesses) for chemicals.

FIG. 4 is a plan view of the lower portion of the chemical holder, a disc with numbers appropriately located so that they are visible through the holes in the upper portion of the chemical holder, FIG. 3, when the two parts of the chemical holder are joined.

FIG. 5 is a plan view of the assembled upper and lower portions of the chemical holder discs, FIGS. 3 and 4, before the chemicals have been placed in the holes (recesses) of the chemical holder.

FIG. 6 is a plan view as in FIG. 5 after the chemicals have been placed in the recesses of the chemical holder.

FIG. 7 is a sectioned isometric view along the line A-A' of FIG. 3.

FIG. 8 is FIG. 7 superimposed on an isometric view of FIG. 4.

FIG. 9 is an isometric partial section of a modification of the chemical holder portion of my invention.

Manufacture

The method of manufacture of the Clinical Temperature Bandage that was used by this inventor was as follows:

Chemicals that have been successfully used in the Clinical Temperature Bandage include, but are not limited to 2-ethoxy napthalene, N-phenyl-benzyl amine, dimethyl Itaconate, phenol, N-(2-hydroxy ethyl) cycle-hexyl amine, 3-chlor propionic acid, 4-phenyl 3-buten 2-one, and lauric acid. All (each) of the above materials, except lauric acid, met directly the melting temperature requirements of the job at hand and were used experimentally with success. Some of those listed exhibited undesirable characteristics, therefore were dropped from use in later development of the Clinical Temperature Bandage. Other chemicals, with suitable melting points, are known but not readily available to this inventor. As a consequence, I prepared blended materials, utilizing lauric acid, with melting temperature approximately 114° F., and to this added 2-ethoxy napthalene, in varying quantity, to produce six blends with reliable melting temperatures of 104°, 103°, 102°, 101°, 100° and 99° F. respectively. As a seventh member of the series, 2-ethoxy napthalene, with melting temperature of approximately 98° F. was used. These seven materials were used for all subsequent manufacture and testing of the Clinical Temperature Bandage.

In the attached drawing: numbers 1 through 5, wherever used in any part of the figures, consistently refer to the same specific part of the Clinical Temperature Bandage. Each part will be described in detail. Number 6, where used, refers to any and all of the several chemicals or blends that are used. Numbers 7 through 11 are used to point out other features of importance to the understanding of the invention. All figures shown are approximately twice normal size on the dimensions other than thickness, which, for clarity, has been grossly expanded. For example: the thickness of a typical Clinical Temperature Bandage is approximately 0.055 inches, but FIG. 2, as shown, is approximately 0.5 inches in this dimension. FIGS. 1 and 2 are plan and elevation respectively of the complete Clinical Temperature Bandage. The remaining seven figures (described earlier) are plan, isometric or cutaway views of the chemical-holder portion of the Clinical Temperature Bandage.

FIGS. 1 through 8 illustrate all or part of a seven-chemical Clinical Temperature Bandage, that permits estimating of temperature, in this example at approximately 1° F. increments between 98° and 104° F. Although not critical to the invention, for simplicity of hand construction, the Clinical Temperature Bandage was made up of five parts, exclusive of chemicals.

Part 1 is a transparent plastic strip, in this case with one adhesive surface. This part serves to anchor the chemical-holder (parts 3 and 4) to the base (adhesive strip part 2). Part 1 also serves as a window through which any change in chemicals may be observed by the user of the Clinical Temperature Bandage. Part 1 must be resistant to action of the chemicals used, and shall tightly seal the surface and circumference of the chemical-holder (parts 3 and 4) so that in conjunction with the base strip (Part 2) the temperature measuring chemicals are effectively guarded from loss, mixing or deterioration. Size or style is not critical, but in this series, part 1 was a transparent cellulose ester adhesive strip approximately 2 inches long by 1 inches wide by 0.002 inches thick (commercially available transparent cellulose adhesive tapes were satisfactory).

Part 2, the base strip, was air and moisture-resistant plastic film with adhesive on one side. A readily removable cover strip (part 5) was used over the adhesive to maintain the tackiness prior to use. Base part 2 serves two functions; first, to seal the bottom of the chemical holder and, second, to anchor the Clinical Temperature Bandage to the body when the temperature is being measured. Although size and style are not critical, the approximate dimensions of part 2 were length 3 inches, width 1 inches, and thickness 0.005 inches.

Part 5 must be of adequate size to cover the adhesive of part 2, and be readily removable. For this series, part 5 was made up of two plastic strips each approximately 1.625 inches long, 1 inches wide and 0.004 inches thick. This permitted complete coverage of the adhesive face of part 2 and provided an easily lifted pull tab.

Part 3, the upper portion of the chemical holder (FIGS. 1,2,3,5,6,7, and 8), in this series was an 0.875 inches diameter disc approximately 0.022 inches thick constructed of absorbent material (blotting paper). Seven 0.1875-inch holes were punched through the blotter disc, one in the center and six symmetrically placed around the center hole, with their centers located on a circle approximately 0.25 inches radius distance from the center of the blotter disc. These seven holes serve as reservoirs for the chemicals to be used. The blotter paper (absorbent material) helps to absorb fluid chemical, if and when liquifaction occurs. The holes are identified by the number 8 in FIGS. 3, 7 and 8.

Part 4, the lower portion of the chemical holder, is an 0.875 inches blotting paper disc (absorbent material), similar to part 3, but with no holes punched in the disc. On part 4, at each point on the disc corresponding to the location of a hole in part 3, one of the following numbers was located; 98, 99, 00, 01, 02, 03, 04 (FIG. 4, No. 7). The numbers were sized and placed to be clearly visible when part 3 was superimposed on part 4, and before chemicals are added. FIG. 5 is a plan view showing the appearance of the chemical holder after part 3 has been superimposed onto part 4, but before the chemicals have been installed. FIG. 8 is an isometric view of parts 3 and 4, with part 3 sectioned to illustrate the relative positions of the numbers on part 4 to the chemical-holding cylinders of part 3. A small amount of commercial rubber cement was placed on one side of part 3. Part 3 was then carefully positioned, cement down, onto part 4, so that one of the numbers on part 4 was clearly visible at the base of each hole in part 3 (FIGS. 5 and 8). Parts 3 and 4 thus become a single chemical-holder unit with seven shallow cylindrical recesses, each with a number at the base. Each recess was then carefully filled with finely ground or pelleted chemical (FIG. 6), the melting temperature of which corresponded to the number at the base of the recess (00 to 4 represent temperatures of 100° to 104° F. respectively). Care was taken to make sure that each number was covered and not visible (FIG. 6).

Part 3 was then carefully covered with the transparent adhesive strip (part 1) and the part 3 part 4 unit was firmly bonded centrally on the back (nonadhesive side) of the base (part 2) by adhesive strip, part 1. The Clinical Temperature Bandage was then complete and ready for use.

It is frequently desirable to roughly approximate temperature. A clinical Temperature Bandage with fewer than seven chemicals would in such case suffice. The chemical holder portion of a three chemical Clinical Temperature Bandage is shown in FIG. 9. In this figure, the chemical holder is indicated as rectangular, of one-piece construction (No. 9), with the chemical holes, or recesses, (No. 10) indented part way through chemical holder FIG. 9. In this instance, three numbers, 98, 00−, and 00+, are shown on the top surface of the chemical holder (No. 9). This particular Clinical Temperature Bandage, when equipped with the proper chemicals, would make it possible to determine whether the temperature was, below or equal to 98° F., between 98° and 100° F., or above 100° F.

Determining Body Temperature

Apply the Clinical Temperature Bandage to the person by removing the protective cover (part 5) from the base of the Clinical Temperature Bandage and placing the adhesive against the skin. A good area is generally on the body under the arm. Observe the chemical windows after a reasonable exposure time, 3 to 5 minutes. As materials melt, numbers become visible. Note the highest number visible. Observe again later. If no higher number has been exposed the temperature may be recorded.

Recording the temperature

If the highest number visible is 00, the temperature is recorded as between 100° and 101° F., and the Clinical Temperature Bandage after test would look like FIG. 1. If the highest number visible is 98, the temperature is between 98° and 99° F.

Disposal of the Clinical Temperature Bandage

This Clinical Temperature Bandage was designed to assure that some or all of any liquid phase chemical would be absorbed. This improves the capability and accuracy of observation, therefore reuse is not recommended. The device should therefore be discarded and a new Clinical Temperature Bandage used if the temperature is to be remeasured.

The manufacture of a reusable Clinical Temperature Bandage is within the scope of this invention. Encapsulation of the chemicals to avoid loss or displacement when liquifaction occurs is the principal change in manufacture that is suggested to permit reuse.

It is apparent that style, shape, size (within limits), temperature numbering or identification methods, chemicals, mixtures, etc., could be readily modified by one skilled in the art. Any and all such changes, however, would be within the scope of this invention.

I claim:

1. A device for estimating body temperature comprising: a plurality of separate chemicals having different melting points, a chemical holder with recesses to separately enclose each chemical of said plurality, each chemical being composed of a different blend of lauric acid and 2-ethoxy napthalene to thereby determine said different melting points, a transparent plastic strip covering said recess in said holder and overlapping said holder, a second strip with adhesive material on one side, and on the opposite side said second strip being contiguous to and overlapping said holder, said transparent plastic strip, by both overlappings, being in contact with said opposite side of said second strip, and adhesive material on said plastic transparent strip adhering both said holder and said second strip to said transparent strip to thereby keep said holder, said second strip and said transparent strip firmly together.

2. The device of claim 1 in which there is provided one additional separate chemical which is substantially pure 2-ethoxy napthalene and said additional chemical being enclosed in another separate recess in said holder.

3. The device of claim 1 in which said chemical holder comprises two discs of absorbent material, one of said discs mounted on the other disc and one of said discs having holes to form said recesses.

4. The device of claim 3 in which said absorbent material is blotting paper.